(12) United States Patent
Miller et al.

(10) Patent No.: US 8,355,348 B1
(45) Date of Patent: Jan. 15, 2013

(54) JOINING MULTIPLE SPANNING TREE NETWORKS ACROSS RING NETWORK

(75) Inventors: Ronald D. Miller, Sausalito, CA (US); Michael Timothy Rollins, Santa Rosa, CA (US)

(73) Assignee: Calix, Inc., Petaluma, CA (US)

( * ) Notice: Subject to any disclaimer, the term of this patent is extended or adjusted under 35 U.S.C. 154(b) by 427 days.

(21) Appl. No.: 12/692,091

(22) Filed: Jan. 22, 2010

Related U.S. Application Data

(60) Provisional application No. 61/234,517, filed on Aug. 17, 2009.

(51) Int. Cl.
*H04L 12/28* (2006.01)
(52) U.S. Cl. ........................................ 370/256
(58) Field of Classification Search .................... 370/256
See application file for complete search history.

(56) References Cited

U.S. PATENT DOCUMENTS

| | | | |
|---|---|---|---|
| 6,304,575 B1 * | 10/2001 | Carroll et al. | 370/408 |
| 6,956,852 B1 * | 10/2005 | Bechtolsheim et al. | 370/389 |
| 7,660,271 B2 * | 2/2010 | Pang | 370/256 |
| 7,688,849 B2 * | 3/2010 | Rabie et al. | 370/466 |
| 2005/0163102 A1 | 7/2005 | Higashitaniguchi et al. | 370/351 |
| 2006/0146857 A1 | 7/2006 | Naik et al. | |
| 2007/0230366 A1 | 10/2007 | Takatori | |
| 2008/0025207 A1 | 1/2008 | Akahane et al. | |
| 2009/0109841 A1 * | 4/2009 | Nozaki et al. | 370/218 |
| 2009/0168671 A1 * | 7/2009 | Holness et al. | 370/256 |
| 2009/0207726 A1 | 8/2009 | Thomson et al. | |
| 2009/0268609 A1 | 10/2009 | Koch et al. | |
| 2009/0279701 A1 | 11/2009 | Moisand et al. | |
| 2010/0226260 A1 * | 9/2010 | Zinjuvadia et al. | 370/248 |
| 2011/0261724 A1 * | 10/2011 | Bulusu et al. | 370/256 |
| 2011/0267983 A1 * | 11/2011 | Ramanathan et al. | 370/256 |
| 2012/0008635 A1 * | 1/2012 | Kuo et al. | 370/410 |

OTHER PUBLICATIONS

G.8032, Ethernet Ring Protection Overview, ITU-T Q9-SG 15, Mar. 2008, 23 pages.
G.S. Antonova, "Spanning Tree Protocol Interoperability with Other Loop Prevention Algorithms," IEEE, 2007, pp. 1098-1101.
IEEE Standard for Local and metropolitan area networks, Media Access Control (MAC) Bridges, IEEE Std 802.1D-2004, Jun. 9, 2004, 281 pages.

(Continued)

*Primary Examiner* — Mark Rinehart
*Assistant Examiner* — Christopher R Crompton
(74) *Attorney, Agent, or Firm* — Shumaker & Sieffert, P.A.

(57) ABSTRACT

In general, this disclosure describes techniques that may allow multiple spanning tree networks to be joined across a ring network. In a ring topology, e.g., an Ethernet ring topology, there are multiple nodes connected one to another to form a ring. Subtending from the ring network are customer devices that may joined together to form networks, e.g., Ethernet networks. Providing only a single connection between a subtending network and the ring network risks isolating the subtending network from the ring network if a fault occurs on the connecting link. Providing two links between a subtending network and the ring network, however, may create an undesirable traffic loop. One example protocol used by the customer devices to communicate with one another in a network and prevent looping paths is Spanning Tree Protocol.

31 Claims, 6 Drawing Sheets

OTHER PUBLICATIONS

IEEE Standard for Local and metropolitan area networks, Media Access Control (MAC) Bridges, Amendment 1: Bridging of IEEE 802.17, IEEE Std 802.17a-2004, Oct. 29, 2004, 11 pages.

Deering, RFC 1112-Host Extensions for IP Multicasting, Network Working Group, Aug. 1989, 16 pages.

Fenner, RFC 2236-Internet Group Management Protocol, Version 2, Network Working Group, Nov. 1997, 24 pages.

Cain et al., RFC 3376-Internet Group Management Protocol, Version 3, Network Working Group, Oct. 2002, 56 pages.

Shah, RFC 3619-Extreme Networks' Ethernet Automatic Protection Switching, Network Working Group, Oct. 2003, 7 pages.

Christensen et al., RFC 4541-Considerations for Internet Group Management Protocol, May 2006, 16 pages.

* cited by examiner

JOINING MULTIPLE SPANNING TREE NETWORKS ACROSS RING NETWORK

This application claims the benefit of U.S. Provisional Application No. 61/234,517, entitled, "JOINING MULTIPLE SPANNING TREE NETWORKS ACROSS RING NETWORK," and filed on Aug. 17, 2009, the entire contents of which being incorporated herein by reference.

TECHNICAL FIELD

The disclosure relates to computer networks and, more particularly, to computer networks connected in a ring topology.

BACKGROUND

A computer network is a collection of interconnected computing devices that can exchange data and share resources. Often, in highly populated areas, the computer network is configured in a ring formation, where certain devices, such as layer 2 devices, e.g., a switch, are interconnected via network links in a ring. That is, each layer 2 device couples via a separate network link to two adjacent layer 2 devices, one clockwise and the other counterclockwise around the ring. When arranged in a ring, a network, e.g., an optical fiber network, a copper network, or a combination of both, is referred to as a "ring network."

Generally, access nodes, subtending from a layer 2 device, provide access to the ring network. Access nodes, such as a Digital Line Subscriber Line Access Multiplexer (DSLAM), a Cable Modem Termination System (CMTS), and a Gigabit Passive Optical Network (GPON) optical line terminal (OLT), for example, each manage access by one or more of the computing devices to the ring network. The access node may, for example, multiplex (or "aggregate") traffic from computing devices into a composite signal and transmit this signal to a switch on the ring network for delivery to one or more destinations.

The computing devices couple to the access nodes to gain access to the ring network and thereby interconnect with other computing devices coupled to the ring network via access nodes. The computing devices generate and receive voice, data, and/or video traffic and exchange this traffic with other computing devices via the interconnection provided by the ring network. The ring network may provide generous geographical coverage due to its topology, which allows the ring network to reach computing devices dispersed over wide geographical areas. The ring network may be resilient in that it can forward data in both the clockwise and counterclockwise directions to avoid a faulted link.

SUMMARY

In general, this disclosure describes techniques that may allow multiple spanning tree networks to be joined across a ring network. In addition, this disclosure describes techniques that may allow a single spanning tree network to be joined to a ring network via a node pair such that the ring network's physical paths appear as a single virtualized spanning tree link as presented to the spanning tree network by the nodes forming the node pair. In a ring topology, e.g., an Ethernet ring topology, there are multiple network nodes connected one to another to form a ring. The network nodes are computing devices such as switches. Subtending from the ring network are customer computing devices.

Using the techniques described in this disclosure, one or more layer 2 networks, e.g., Ethernet networks, using Spanning Tree Protocol, may be joined with a layer 2 ring network, e.g., Ethernet ring network. These techniques may allow for inter-operation of spanning tree networks and Ethernet ring networks without adversely affecting the ability of the ring topology and the ring control protocol to correctly route traffic. In addition, these techniques may provide a mechanism for allowing network routes to be reconfigured as a result of changes to either the spanning tree topology or Ethernet ring topology.

In one example, the disclosure is directed to a method comprising providing, in a ring network, a first pair of nodes and a second pair of nodes, and configuring each node of the first pair of nodes of the ring network to connect to a first spanning tree network and configuring each node of the second pair of nodes of the ring network to connect to a second spanning tree network.

In another example, the disclosure is directed to a network comprising a first pair of nodes and a second pair of nodes configured in a ring network, and a first spanning tree network and a second spanning tree network, wherein each node of the first pair of nodes of the ring network is configured to connect to the first spanning tree network, and wherein each node of the second pair of nodes of the ring network is configured to connect to the second spanning tree network.

In another example, the disclosure is directed to a network device comprising a processor configured to receive a spanning tree bridge protocol data unit (BPDU) from a first spanning tree network, perform spanning tree computations on the BPDU to produce a new BPDU based on the received BPDU, encapsulate the new BPDU as header information or trailer information in a ring topology protocol control data unit, and transmit the new BPDU around the ring network.

In another example, the disclosure is directed to a network device comprising means for receiving a spanning tree bridge protocol data unit (BPDU) from a first spanning tree network, means for performing spanning tree computations on the BPDU to produce a new BPDU based on the received BPDU, means for encapsulating the new BPDU as header information or trailer information in a ring topology protocol control data unit, and means for transmitting the new BPDU around the ring network.

In another example, the disclosure is directed to a computer-readable medium comprising instructions encoded on the computer-readable medium that, upon execution, cause a processor within a network device to receive a spanning tree bridge protocol data unit (BPDU) from a first spanning tree network, perform spanning tree computations on the BPDU to produce a new BPDU based on the received, encapsulate the new BPDU as header information or trailer information in a ring topology protocol control data unit, and transmit the new BPDU around the ring network.

The details of one or more aspects of the disclosure are set forth in the accompanying drawings and the description below. Other features, objects, and advantages will be apparent from the description and drawings, and from the claims.

DETAILED DESCRIPTION

Ring topologies, e.g., Ethernet ring topologies, are commonly used in networks as they require less optical fiber or copper for connectivity and provide an effective topology for creating a loop-free, layer 2 network with good convergence times. Ring topologies include a number of network devices, or transport nodes, connected such that each transport node is connected to two other transport nodes, thereby forming a ring configuration. Ring topologies require a transport node to be configured as a control node to block traffic in order to prevent a traffic loop around the ring network.

For certain types of data that do not include a specific destination, such as multicast or broadcast data, for example, each of the transport nodes in the ring network may simply forward this data around the ring to ensure each node forwards the ring to every transport node. If none of the transport nodes detects that this data is looping the ring network, each switch may continue to forward the traffic endlessly, thereby establishing a traffic loop, which may substantially impact the performance of the ring network by needlessly consuming network resources, such as switch processing time and memory as well as link bandwidth. In order to prevent traffic loops, one of the transport nodes may be configured to function as a control node to block traffic on one port and thereby terminate a loop.

A control node also may be referred to as a master node. During normal operation, the control node is responsible for placing a block in the data path of the ring in order to prevent a traffic loop. The control node is also responsible for communicating with non-control nodes, via messaging protocols, on the ring network in order to manage and control ring topology changes. A network operator may designate a node as the control node during creation and deployment of the ring network. Failure by the network operator to designate a control node on the ring network may result in a permanent traffic loop, e.g., in the layer 2 Ethernet network.

As mentioned above, customer computed devices subtend from the ring network. These customer devices may also be joined together to form one or more networks, e.g., Ethernet networks. Providing only a single connection between a subtending network and the ring network risks isolating the subtending network from the ring network if a fault occurs on the connecting link. Thus, it may be desirable to connect each subtending network to the ring network via two links, each link being connected to a separate ring node, in order to provide a redundant path to the ring network in case a fault occurs. The network nodes that provide redundant paths between a subtending network and the ring network are sometimes referred to as a protection pair or nodes in that they provide link protection. Providing two links between a subtending network and the ring network is desirable for protection, but may create an undesirable traffic loop. One example protocol used by the customer devices to communicate with one another in a network and prevent looping paths is Spanning Tree Protocol.

Figure 1:
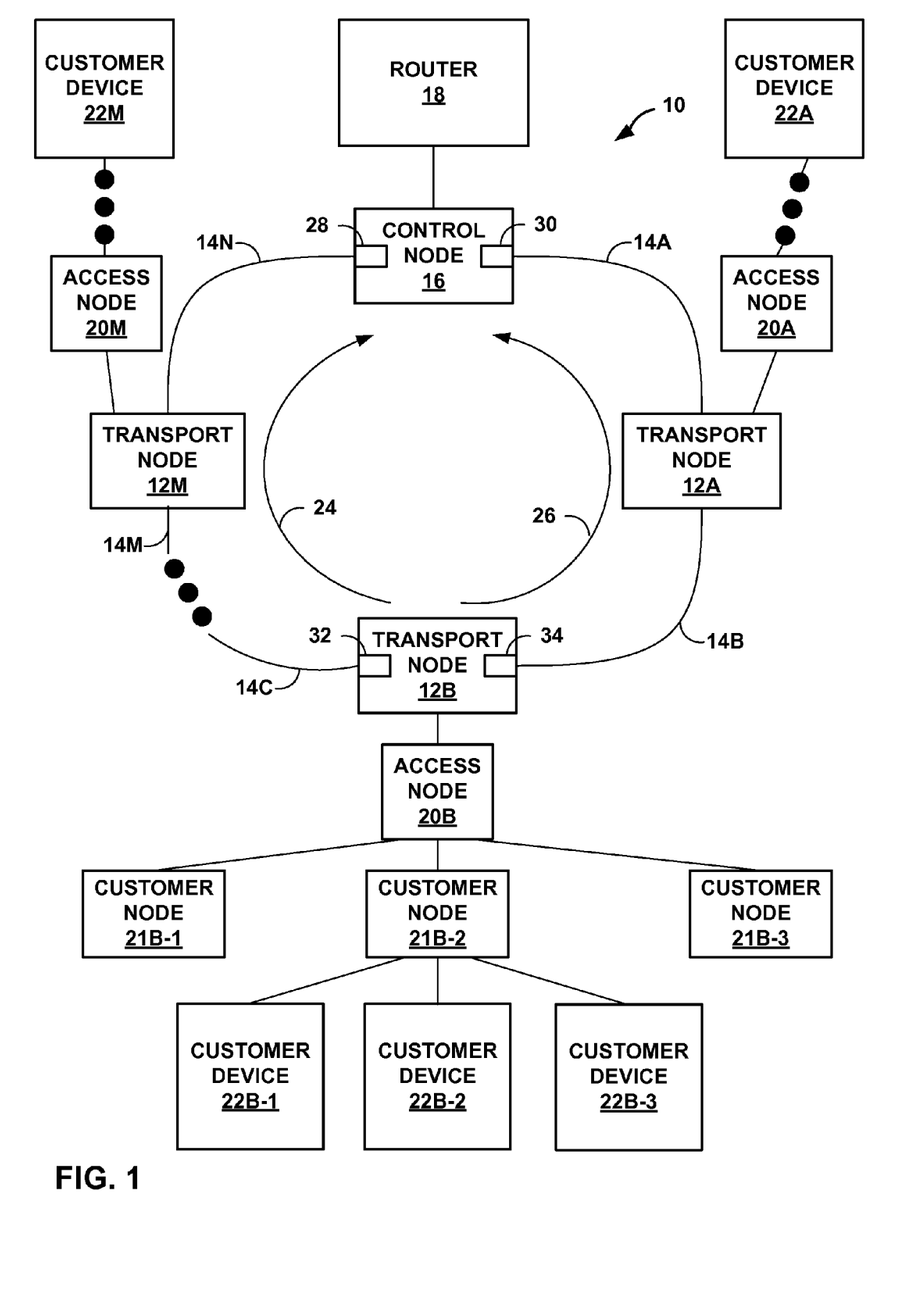
FIG. 1 is a block diagram illustrating an example ring network.

FIG. 1 is a block diagram illustrating an example ring network. As shown in FIG. 1, ring network 10 includes transport nodes 12A-12M ("transport nodes 12"), links 14A-14N ("links 14"), a control node 16, router 18, access nodes 20A-20M ("access nodes 20"), customer nodes 21A-21M ("customer nodes 21"), and customer devices 22A-22M ("customer devices 22"). Transport nodes 12 and control node 16 are coupled via respective links 14 to form a ring topology. For example, control node 16 is coupled to transport node 12A via link 14A, transport node 12A is coupled to transport node 12B via link 14B, and so on, completing the ring with transport node 12M coupled to control node 16 via link 14N. Each transport node 12 may be coupled to an access node 20. Each access node 20 may be coupled to one or more customer nodes 21, which in turn may be coupled to one or more customer devices 22. Access nodes, e.g., Digital Line Subscriber Line Access Multiplexer (DSLAM), a Cable Modem Termination System (CMTS), a Gigabit Passive Optical Network (GPON) Optical Line Terminal (OLT), or other broadband service transport and/or aggregation elements, each manage access by one or more of the customer devices to the ring network. Router 18, a layer 3 device, provides access to a layer 3 network (not shown), e.g., the Internet. Additional examples of transport and/or aggregation elements include the Calix C7 Multiservice Access Platform and the Calix E5 Multiservice Ethernet Service Platform, commercially available from Calix Networks, Inc., of Petaluma, Calif.

Customer nodes 21 may comprise one of many devices used to connect a customer device, e.g., customer device 22, to a network, e.g., ring network 10 and the Internet. Customer node 21 may include hardware devices such as, but is not limited to, a cable modem, a digital subscriber line (DSL) modem, and/or an optical network terminal (ONT). Numerous customer nodes 21 may subtend from an access node. For example, in FIG. 1, three customer nodes, namely customer nodes 21B-1, 21B-2, and 21B-3 are shown subtending from access node 20B. While three customer nodes are depicted subtending from access node 20B, there may be more, or fewer, customer nodes 21B in a given implementation.

Subtending from each customer node 21 is one or more customer devices 22. Customer devices 22 may comprise a wide variety of hardware computing devices, such as one or more of a personal digital assistant (PDA), a workstation, a personal computer, a laptop computer, a television set-top box, a voice-over-internet protocol (VoIP) telephone, or any other computing device capable of generating and/or receiving traffic via ring network 10 and access node 20. That is, customer devices 22 may comprise any computing device capable of implementing network protocols, such as a transmission control protocol (TCP)/internet protocol (IP), to receive and forward traffic to and from access nodes 20. It should be noted that each access node may be coupled to multiple customer devices 22. In addition, a single transport node 12 may be coupled to multiple access nodes 20 (not shown).

As seen in FIG. 1, numerous customer devices 22 may subtend from a single customer node 21. For example, in FIG. 1, three customer devices, namely customer devices 22B-1, 22B-2, and 22B-3, are shown subtending from customer node 21B-2. While three customer devices are depicted subtending from customer node 21B-2, there may be more, or fewer, customer devices 22 in a given implementation. Customer devices 22, as described above, may include various client hardware computing devices configured to support a variety of services such as voice, video and data services.

Exemplary ring network 10 may be configured to provide a wide area network (WAN) or a metropolitan area network (MAN). Ring network 10, because it services two or more customer devices 22, may be referred to as a "backbone" network, in that ring network 10 provides a backbone to support the exchange of traffic between customer devices 22. Typically, to support the high level of traffic often found on backbone networks, links 14 may comprise optical fiber links to facilitate the rapid transfer of the traffic around ring network 10.

Transport nodes 12, e.g., a layer 2 device such as a layer 2 switch, receive and forward traffic from customer devices 22, via access nodes 20, over ring network 10. Although each access node 20 is shown subtending from a transport node 12, this is a logical division and the access node may reside in the transport node. Each of transport nodes 12 also forward traffic received from other transport nodes 12 and control node 16 via ring network 10 to respective customer devices 22.

The ring topology of ring network 10 may offer wide geographic coverage and reasonable resilience. That is, ring network 10 may reach customer devices 22 dispersed over wide geographic areas. Ring network 10 provides resilience because traffic may be forwarded in both a clockwise direction 24 and counterclockwise direction 26 around ring network 10. By enabling both directions of forwarding, transport nodes 12 may forward traffic so as to avoid one of links 14 that has failed, while still reaching every one of the transport nodes 12 and control node 16.

Upon detecting a fault in link 14A, for example, control node 16 may forward traffic via link 14N counterclockwise around ring network 10 to reach transport node 12A. Transport node 12A may, to avoid faulted link 14A, simultaneously forward traffic via link 14B clockwise around ring network 10 to reach control node 16. Ring network 10 therefore may support simultaneous forwarding of traffic in both the clockwise and counterclockwise directions to avoid the faulted link. Consequently, ring network 10 may not only provide wide geographical coverage but reasonable resilience as well. Layer 2 access networks are commonly built using ring topologies to conserve fiber and provide an effective topology for network resilience and convergence after a failure.

While providing wide geographical coverage and reasonable resilience, the ring network may suffer from traffic loops. For certain types of data that do not include a specific destination, such as multicast or broadcast data, for example, each of the transport nodes 12 may simply forward this data around the ring to ensure each transport node 12 forwards the data to every computing device. If none of transport nodes 12 identify that this data is looping the ring network, each transport node 12 may continue to forward the traffic endlessly, thereby establishing a traffic loop. As mentioned above, a traffic loop may substantially impact the performance of the ring network by needlessly consuming network resources, such as switch processing time and memory as well as link bandwidth.

In order to correct for traffic loops, a master device, e.g., control node 16, may be configured using one of many ring topology protocols, e.g., IEEE 802.17 Resilient Packet Ring Protocol, Rapid Ring Protection Protocol, Resilient Ethernet Protocol, and RFC-3619, to block traffic in one direction via one of its ports. Control node 16 may include primary port 28 and secondary port 30. In one implementation, control node 16 forwards traffic via primary port 28 and blocks traffic via secondary port 30. Traffic that is blocked at secondary port 30 may be discarded so that it is not forwarded through the loop again. Typically, control node 16 blocks secondary port 30 logically. In other words, control node 16 may actively filter traffic arriving via secondary port 30, discarding or dropping certain traffic, such as data traffic, but allowing other traffic, such as control traffic used by control node 16 to monitor or otherwise control ring network 10. By blocking traffic arriving via secondary port 30 in this manner, control node 16 ensures that data traffic does not continually loop through the ring network, while preserving the beneficial aspects of wide geographical coverage and resilience associated with the ring network.

As mentioned above, customer nodes 21 and customer devices 22 may be joined together to form one or more networks, e.g., Ethernet networks, that subtend from ring network 10. Connecting each subtending network to the ring network via two links, each link being connected to a separate ring node, in order to provide a redundant path to the ring network in case a fault occurs, may create an undesirable traffic loop. One example protocol used by customer devices to communicate with one another in a network and prevent looping paths is Spanning Tree Protocol (STP). In general, this disclosure describes techniques that may allow multiple spanning tree networks to be joined across a ring network. Although the disclosure references Spanning Tree Protocol for purposes of illustration, other protocols such as Rapid Spanning Tree Protocol (RSTP) may also be used.

Figure 2:
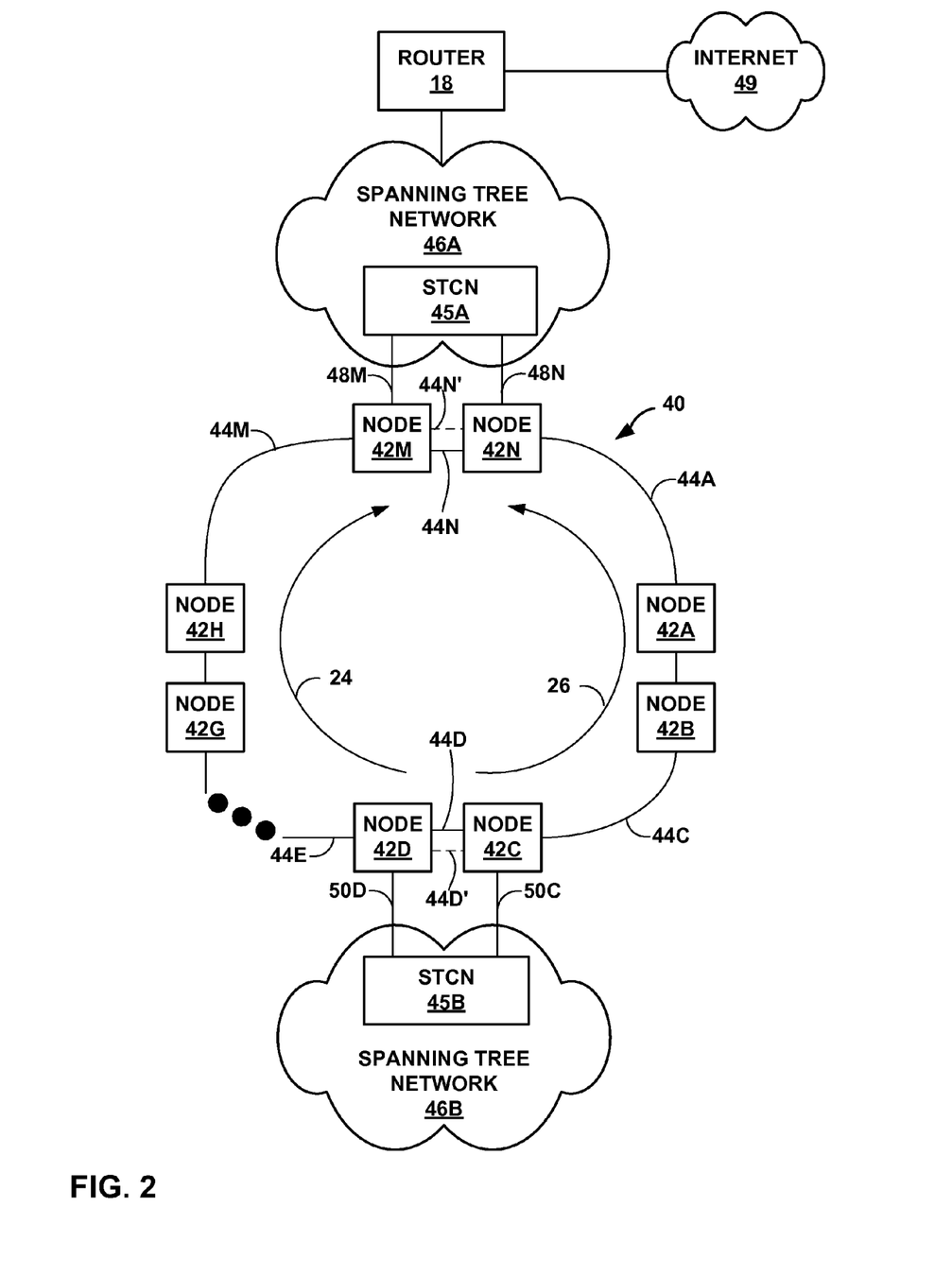
FIG. 2 is a block diagram illustrating an example ring network joined with multiple spanning tree networks using the techniques described in this disclosure.

FIG. 2 is a block diagram illustrating an example ring network joined with multiple spanning tree networks using the techniques described in this disclosure. Ring network 40 of FIG. 2 is similar to ring network 10 depicted in FIG. 1. In FIG. 2, however, the distinction between the control node and transport nodes has been removed. That is, each node on ring network 40 is simply referred to as a node. Thus, ring network 40 includes nodes 42A-42N ("nodes 42") interconnected via ring network links 44A-44N ("ring links 44") in a ring. Each node 42 is a hardware device, for example, a transport and/or aggregation element including the Calix E5 Multiservice Ethernet Service Platform, commercially available from Calix Networks, Inc., of Petaluma, Calif. It should be noted that ring network 40 requires that one of nodes 42 act as a control node, but in accordance with this disclosure, any of nodes 42 may act as a control node.

FIG. 2 further depicts ring network 40 joined across multiple spanning tree networks, namely, spanning tree networks 46A and 46B ("spanning tree networks 46"). Each spanning tree network 46 may comprise one or more customer nodes, and one or more customer devices may subtend from each customer node. For purposes of simplicity, customer nodes and customer devices have not been shown in FIG. 2. Further, the distinction between access nodes and transport nodes, as shown in FIG. 1, has been removed in FIG. 2. The techniques of this disclosure are applicable regardless of whether nodes 42 that join spanning tree networks 46 to ring network 40 function as transport nodes, access nodes, or control nodes.

First spanning tree network 46A is connected to ring network 40 via two spanning tree enabled links, spanning tree links 48M and 48N. In particular, spanning tree capable node ("STCN" in FIG. 2) 45A of spanning tree network 46A is connected to a first node pair comprising nodes 42M, 42N on ring network 40 via two spanning tree links 48M, 48N, respectively. Node pairs are also referred to in this disclosure as an STP domain. In other words, an STP domain may include a pair of nodes present on the ring network, e.g., an Ethernet Automatic Protection Switching ("EAPS") ring network, which provide a node protected handoff scheme from the ring to the spanning tree links, e.g., spanning tree links 48M, 48N. Within a ring of nodes, multiple STP domains may be defined. This may allow the ring to have multiple points where spanning tree enabled links are protected by a pair of nodes. In some examples, a given node may only belong to one STP domain at a time. While the two that make up a given STP domain may be located immediately adjacent to each other on the ring, this is not required. Indeed, the STP domain can function properly if the two nodes are not adjacent to each other on the ring.

A first ring node may be coupled to the STP-capable node via a first spanning tree link, and a second ring node may be coupled to the STP-capable node via a second spanning tree link. Hence, the first and second spanning tree links provide redundant links between the STP-capable node and the ring network. The first spanning tree link may be a primary link that is normally used for communication between the STP-capable node and the ring network, whereas the second spanning tree link may be a secondary link that is normally not used for communication between the STP-capable node and the ring network, and instead serves as a backup spanning tree link. When the spanning tree first link fails, due to a fiber cut or some other failure event, the second spanning tree link takes over, permitting the STP-capable node to continue to communicate with the ring network.

Hence, within the pair of nodes that make up the STP domain, one node may be provisioned as the primary node, e.g., node 42M, and the other may be provisioned as the secondary node, e.g., node 42N. Spanning tree traffic always travels on the STP domain's primary node. It should be noted that there is no correlation between the assignment of STP domain primary and secondary nodes versus the assignment of the ring's control node. The ring network's control node may be one of the STP domain ring nodes or may be another node on the ring.

For each protected spanning tree link, if the spanning tree link to the primary ring node, e.g., node 42M is intact, then that spanning tree link, e.g., spanning tree link 48M, will carry traffic and the corresponding spanning tree link, e.g., spanning tree 48N, to the secondary ring node, e.g., node 42N, will be blocked from carrying traffic. There are two reasons why it is important for traffic on the secondary node's spanning tree link to be blocked when the primary node's spanning tree links are intact. First, the secondary node's spanning tree link is meant to be a "protection link," and thus its role is to only carry traffic when the corresponding spanning tree link on the primary node has failed. Second, by blocking traffic on the secondary node's links, it may ensure that network traffic does not enter in through the primary node, travel around the ring, and then exit out via the secondary node. In other words, it is undesirable for spanning tree protocol devices, e.g., devices implementing STP or RSTP control processes, to think that the ring is the cheapest path between two network nodes on the ring. Of course, in the unlikely scenario that the ring represents the only path between two network nodes, then the spanning tree protocol may be allowed to unblock the secondary node's links.

If the spanning tree link, e.g., spanning tree link 48M, between the STP capable node, e.g., STCN 45A, and the primary ring node, e.g., 42M, fails, then traffic will flow on the secondary node's spanning tree link, e.g., 48N. Once the spanning tree link from the STP capable node to the primary ring node has been restored, the traffic will automatically revert back to flowing through the primary node, due to the lower path cost associated with the spanning enable link associated with the primary node, as described in more detail below. Each link on the spanning tree network has an associated cost, or "path cost." When a node is provisioned to be in an STP domain, regardless of whether the node is a primary node or a secondary node, then that node's spanning tree enabled link is provisioned to have STP enabled will become part of the STP Domain.

On the STP domain's primary and secondary ring nodes, software may automatically assign special STP path costs to the spanning tree enabled links that will be participating in STP on the node. A path cost is the cost of a link that terminates a given port. The path costs of the spanning tree enabled links on the primary node, e.g., node 42M, and secondary node, e.g., node 42N, may be set in a manner to ensure that the secondary node's spanning tree enabled link is blocked. In some examples, the path costs may be hard-coded and not modifiable by the network operator. While these path costs are not directly loaded into the new BPDU generated based on the received BPDU, as described in more detail below, the path costs are used in the computation of the new BPDU. In order to ensure that a node processor applying the spanning tree protocol process determines that the secondary node's spanning tree enabled link is to be blocked, the path costs assigned to the various spanning tree enabled links on the primary node and the secondary node may drive the spanning tree protocol to make two determinations. First, in some examples, on the secondary node, the "root port" should point to the primary node, i.e., the root port must be that of the STP-enabled virtual link, e.g., virtual link 44N', that connects the secondary node to the primary node. Virtual link 44N' is depicted in FIG. 2 as a dotted line between node 42M and node 42N to distinguish virtual link 44N' from ring link 44N (shown as a solid line between node 42M and node 42N). It is understood that any traffic designated for virtual link 44N' is carried by physical ring link 44N. There is no cost associated with this STP-enabled virtual link, ensuring that spanning tree processing on nodes 42M and 42N, for example, never needs to block this link. The STP-enabled virtual link is automatically created by the software. The "root port" is the port on the network device that has cheapest path cost to the root node. This means that the cheapest cost from the secondary node back to the root node should be through the primary node, and thus will never be back through the secondary node's spanning tree enabled link. Second, on the spanning tree network or customer nodes (i.e., external nodes outside the ring network) that are directly connected to the secondary ring node, i.e., the nodes on the other end of the secondary node's spanning tree enable link, these external nodes should never select the port connected to the secondary node to be its root port. These external nodes should always determine that the connection to the secondary node does not represent the cheapest path back to the spanning tree root node. However, as stated above, if the secondary node provides the only path between an external node and the spanning tree root node, then a process executing the spanning tree protocol will be forced to unblock the traffic on the secondary ring node's link. These two determinations, that on the secondary node, the "root port" should point to the primary node and that external nodes outside the ring network should never select the port connected to the secondary node to be its root port, ensure that the secondary ring node's, e.g., node 42N, spanning tree enabled link, e.g., node 48N, will never be determined to be a "root port" by the nodes on either end of that spanning tree enabled link. Therefore, the spanning tree protocol will determine that the link in question creates a loop and thus will cause the link to be blocked.

On the STP domain's ring nodes, software may inhibit an RSTP stack, for example, from blocking traffic on the ring node ports. Blocking of the ring links remains the responsibility of the ring stack. In order to support multiple STP domains on the same ring, each STP domain on the ring may be given unique identifier, or "STP Domain Name," as described in more detail below. This name may be programmed into memory associated with the two ring nodes in each STP domain, e.g., by a network operator.

It should be noted that any node may be the root bridge, or root node, for the spanning tree network. Among the nodes on the ring, only the primary node and the secondary node are recognized in the spanning tree network. The other nodes on the ring are transparent to the spanning tree network. From the point of view of the spanning tree protocol, e.g., RSTP or STP, it is as if the primary node is directly connected to the secondary node via a spanning tree enabled link.

In the example of FIG. 2, second spanning tree network 46B is connected to ring network 40 via two links, links 50C and 50D. In particular, spanning tree capable node 45B of spanning tree network 46B is connected to a second node pair, also referred to as a second STP domain, comprising nodes 42C, 42D on ring network 40 via two links 50C, 50D, respectively. It should be noted that although only one spanning tree capable node has been shown with respect to a spanning tree capable network, e.g., STCN 45A of spanning tree network 46A, there may be multiple spanning tree capable nodes associated with a spanning tree network.

First spanning tree network 46A may be connected to Internet 49, for example, by router 18. In such an example configuration, traffic may be transmitted via second spanning tree network 46B to ring network 40, traverse ring network 40, exit ring network 40 onto first spanning tree network 46A, and be forwarded via router 18 to Internet 49. Likewise, traffic from Internet 49 may reach router 18 and be forwarded via router 18 through spanning tree network 46A to ring network 40, traverse ring network 40, and exit ring network 40 onto second spanning tree network 46B.

Spanning tree networks 46 may be configured, for example, as a SONET/Packet network, a logical rapid spanning tree protocol (RSTP) network, or a point-to-point RSTP network. Each spanning tree capable node 45A, 45B ("spanning tree capable node 45") may be any layer 2 device, or any device capable of running a layer 2 protocol and STP. For example, spanning tree capable node 45 may be a DSLAM, a layer 2 switch, a router running a layer 2 protocol, or a Calix C7 Multiservice Access Platform or a Calix E5 Multiservice Ethernet Service Platform, commercially available from Calix Networks, Inc., of Petaluma, Calif. As mentioned previously, providing two connections between spanning tree networks 46, in particular spanning tree capable nodes 45, and ring network 40, provides a redundant path in case a fault occurs on a link, e.g., spanning tree link 48M. This redundant path, however, may create a traffic loop.

In accordance with this disclosure, STP may be used on multiple spanning tree networks 46 joined across ring network 40 in order to prevent loops from forming. For example, in FIG. 2, ring link 44N and spanning tree links 48N, 48M create a loop between ring network 40 and spanning tree capable node 45A. In order to prevent the loop, one of spanning tree links 48M, 48N must be logically blocked. In order to logically block one of spanning tree links 48M, 48N, a network operator uses STP to select a root bridge, or root node, for spanning tree network 46A. For example, node 42M may be selected as the root bridge for spanning tree network 46A. In STP, each link on the spanning tree network has an associated cost. For example, if a first link is further away from the root bridge than a second link, the first link may be assigned a higher cost. Also, the technology of the link is factored into the cost. For example, a link that is optical fiber may have a lower cost than a link that is copper, due to the generally faster transmission rates of fiber. In this manner, a cost is associated with one of spanning tree links 48M, 48N and as such, spanning tree capable node 45A is able to block one of spanning tree links 48M, 48N, e.g., spanning tree link 48N, and prevent a loop from forming. Should a break occur in spanning tree link 48M, the spanning tree processing on spanning tree capable node 45A and on node 48N will recognize that link 48N is the only remaining link between spanning tree capable node 45A and the protected pair 42M and 42N, and thus spanning tree link 48N will be unblocked. For more information on STP, see IEEE 802.1D, the IEEE standard which defines STP, the entire content of which being incorporated herein by reference.

Connections between nodes 42 in ring network 40, however, should not be managed using STP, however. That is, because STP assigns costs to different links of a network, some links on ring network 40 may become completely isolated if STP were allowed to run on nodes 42 that form ring network 40. But, each of the nodes forming a node pair, e.g., nodes 42M, 42N and nodes 42C, 42D, each must have knowledge of the spanning tree network to which they are respectively connected. Thus, in accordance with this disclosure, these nodes act as both ring nodes and STP nodes and apply both STP for interaction with STP nodes in a spanning tree network and ring protocol for interaction with ring nodes on a ring network.

Using the techniques of this disclosure, nodes forming a node pair, e.g., nodes 42M, 42N, on ring network 40 exchange spanning tree information, encapsulated in ring topology protocol control data units. From the point of view of a spanning tree network, e.g., spanning tree network 46A, the ring network's diverse physical paths appear as a single virtualized spanning tree link as presented to the spanning tree capable node or spanning tree network by the nodes forming the node pair. A spanning tree capable node, e.g., STCN 45A, is connected to its associated node pair via two paths, e.g., spanning tree links 48M, 48N, only one of which is active (the other being blocked to prevent a loop, as described above). The two nodes of the node pair are connected via an STP-enabled virtual link, e.g., virtual link 44N'. There is no cost associated with this STP-enabled virtual link, ensuring that spanning tree processing on nodes 42M and 42N, for example, never needs to block this link. As mentioned above, Rapid Spanning Tree Protocol (RSTP) may also be used.

STP does not need to prevent loops on ring network 40. Rather, the ring topology protocol, e.g., IEEE 802.17 Resilient Packet Ring Protocol, Rapid Ring Protection Protocol, Resilient Ethernet Protocol, and RFC-3619, used by ring network 40 prevents loops on the ring network. In other words, it is the responsibility of the ring control protocol to control the physical ring paths between ring nodes 42A-42M and prevent routing loops on the ring 40.

As will be described in more detail below, a spanning tree network, e.g., spanning tree network 46A, transmits via a spanning tree capable node, e.g., STCN 45A, spanning tree bridge protocol data units (BPDU) comprising spanning tree information to both of the nodes forming the node pair, e.g., nodes 42M and 42N of node pair connected to the spanning tree capable node. A network operator configures nodes 42M and 42N to operate as a node pair, also referred to in this disclosure as a node protection pair because the redundant spanning tree links 48M, 48N protect spanning tree network 46A from a fault. For example, a network operator may set a control bit enabling node protection and thus designate the node as part of a node protection pair. By virtue of this designation, nodes 42M and 42N begin exchanging ring topology protocol control data units comprising encapsulated spanning tree bridge protocol data units (BPDU). This spanning tree bridge protocol data unit (BPDU) information is used by the internal spanning tree state machine of each ring node of the node protection pair so that each node 42N, 42M of the node protection pair may compute the spanning tree path costs with respect to the links joining the spanning tree capable node 45A to the node pair, e.g., via spanning tree links 48M and 48N, and the virtual spanning tree link, e.g., virtual link 44N', embodied by the physical ring path of ring network 40 and known to both nodes 42N, 42M of the node protection pair in order to present a coherent spanning tree view to the subtending spanning tree capable node, e.g., STCN 45A.

Both nodes, e.g., node 42M and 42N, of the node protection pair that are connected to the spanning tree capable node, e.g., STCN 45A, receive the spanning tree information from the spanning tree capable node 45A via BPDUs and perform spanning tree computations via spanning tree algorithms based on information provided in the received BPDUs. Spanning tree algorithms perform computations in order to transmit a newly generated STP BPDU to the other node in the protection pair. The node, e.g., node 42M, encapsulates this new STP BPDU into a ring topology protocol control data units and transmits the encapsulated new STP BPDU around the ring to the other node forming the node protection pair, e.g., node 42N. The node, e.g., node 42M, may send the encapsulated BDPU on both network paths, e.g., clockwise direction 24 and counterclockwise direction 26, around the ring. In one example, the spanning tree information is encapsulated in a header or a trailer of the ring topology protocol control data unit. By placing the spanning tree information in a header, for example, the ring topology protocol data units are not recognized as being spanning tree BPDUs and, as such, may traverse the ring via nodes 42 without ring network 40 having to run STP. That is, unless the spanning tree information is pertinent to a particular node pair connected to a spanning tree network, nodes 42 may generally ignore the spanning tree information contained within the ring topology protocol control data unit and simply forward the data unit around the ring to the next node 42.

In one example, in accordance with this disclosure, unique metadata is present in a field of the encapsulated BPDUs. The unique identifier allows nodes of the node protection pair, e.g., nodes 42M and 42N, to identify and receive encapsulated BPDUs comprising spanning tree information that are addressed to each other. The unique identifier for the node pair is at least unique with respect to the identifiers of the other node pairs within the ring network. A network operator may program each node pair with the unique identifier. Examples of unique identifiers include, but are not limited to, a character string or a number.

In addition to the unique identifier, the encapsulated BPDU may include an identifier that identifies the root bridge for the spanning tree network. In one example, one of the nodes of the node protection pair may be the root bridge for the spanning tree network. Alternatively, spanning tree capable node 45A may also be the root bridge. For example, node 42M may be the root bridge for spanning tree network 46A in FIG. 2. As such, an encapsulated BPDU may include a field in a header identifying node 42M as the root bridge. The identifier may be, for example, a MAC address of node 42M. The encapsulated BPDU may also include path costs associated with the spanning tree network. In one example, the first field in a header of the BPDU includes the root bridge identifier and a second field in a header includes the path costs associated with the links in the spanning tree network.

The encapsulated BPDU may be addressed to a special multicast MAC address, tagged with a control VLAN ID, e.g., EAPS control VLAN ID, contain the unique identifier assigned to the node protection pair, contain the provisioned node protection role (primary or secondary) of the node, and/or contain the full RSTP BPDU.

It should also be noted that neither node of a node protection pair, e.g., node 42M or node 42N, need be a control node in order for the techniques of this disclosure to be employed. However, in some examples, one of the nodes of a protection pair is a control node.

As mentioned above, using the techniques of this disclosure, multiple spanning tree networks 46 may be joined across ring network 40. For example, ring network 40 includes two spanning tree networks 46A, 46B. Although FIG. 2 depicts only two spanning tree networks 46A, 46B joined across ring network 40, the number of spanning tree networks that may be joined across ring network 40 may be limited only by the number of node pairs that ring network 40 can support.

Second spanning tree network 46B is connected to ring network 40 via two spanning tree enabled links, spanning tree links 50C and 50D. In particular, spanning tree capable node 45B of spanning tree network 46B is connected to a second node pair comprising nodes 42C, 42D on ring network 40 via two links 50C, 50D, respectively. A network operator may also designate nodes 42C and 42D as node protection pairs that exchange encapsulated BPDUs comprising spanning tree information related to ring link 44D and spanning tree links 50C, 50D to present a coherent spanning tree view to the subtending spanning tree capable node, e.g., 45B. A network operator programs each of nodes 42C and 42D with a unique identifier, e.g., character string or numerical value.

Similar to the description above with respect to first spanning tree network 46A, second spanning tree network 46B transmits, via STCN 45A, spanning tree BPDUs comprising spanning tree information to one of the nodes forming the node protection pair, e.g., primary node 42C of node pair 42C, 42D, connected to the STCN 45B. The spanning tree algorithm on node 42C, for example, performs computations in order to generate and transmit a new STP BPDU to the STP-enabled virtual link, e.g., virtual link 44D', that connects the two nodes of the node pair, e.g., nodes 42C and 42D, based on the BPDU received from spanning tree capable node 45B. Virtual link 44D' is depicted in FIG. 2 as a dotted line between node 42C and node 42D to distinguish virtual link 44D' from ring link 44D (shown as a solid line between node 42C and node 42D). It is understood that any traffic designated for virtual link 44D' is carried by physical ring link 44D. Before transmitting the new BPDU, the node, e.g., node 42C, encapsulates this new STP BPDU, along with the unique identifier for node pair 42C, 42D, into a ring topology protocol control data units. Node 42C transmits the encapsulated STP BPDU around the ring on both network paths, e.g., clockwise direction 24 and counterclockwise direction 26, to the secondary node forming the node protection pair, e.g., node 42D.

Ring nodes receive all BPDUs, but filter them via several stages. As described in more detail below, ring nodes that have node protection enabled, e.g., nodes 42M and 42N, are programmed with a protection ID that allow, in a first stage, each node with node protection enabled to capture encapsulated BPDUs for further inspection. If the node does not have node protection enabled, the BPDU is simply forwarded. If, however, node protection is enabled, second stage of filtering is performed. Node protection pairs that receive an encapsulated BPDU that includes a unique identifier that is different from the unique identifier that was programmed into the node by the network operator may forward the control data unit including the BPDU around the ring without taking action. In this manner, the node protection pair that has a programmed unique identifier that matches the unique identifier in the BPDU will receive the data unit. For example, if node protection pair 42M, 42N receives a ring control data unit that includes a unique identifier for node protection pair 42C, 42D, nodes 42M and 42N forward the packet around the ring without taking any action. Nodes 42M and 42N do not need to know the spanning tree information related to spanning tree network 46B (joined across ring network 40 via nodes 42C and 42D). Nodes 42M and 42N need to exchange spanning tree information between one another that relates to spanning tree network 46A, for which they form a node protection pair. It should be noted that the control node on ring network 40 will forward the BPDU through the port that it blocked in order to prevent looping. Node protection pairs that receive an encapsulated BPDU addressed to them via their unique identifier use the received spanning tree information for internal spanning tree computations in order to keep track of any network changes to the spanning tree network to which they are associated. For example, if nodes 42M and 42N form a node protection pair, primary node 42M may receive a BPDU from STCN 45A, perform spanning tree computations and generate a new BPDU based on the received BPDU, encapsulate the new BPDU, including the unique identifier for node protection pair 42M, 42N, and transmit the encapsulated BPDU around ring network 40. Secondary node 42N will eventually receive the encapsulated BPDU and, based on the unique identifier, will recognize that the BPDU is addressed to node 42N.

As mentioned above, in STP, each link on the spanning tree network has an associated cost. For example, if a first link is further away from the root bridge than a second link, the first link is assigned a higher cost. Also, the technology of the link is factored into the cost. For example, a link that is fiber may have a lower cost than a link that is copper, due to the faster transmission rates achievable using fiber.

In accordance with techniques of this disclosure, a biasing factor may be associated with a path cost presented to the spanning tree network via a BPDU in order to allow a network operator to bias the spanning tree network toward selecting one of the nodes of the node protection pair as always having the unblocked link to the STCN, with the other node of the node protection pair always having the blocked link to the STCN in the spanning tree network. In other words, a biasing factor may be associated with a path cost in order to bias selection of a particular node in order to achieve a preferred path. The biasing factor may weight a first link more heavily during determination of blocked and unblocked links connecting to the spanning tree network. For example, two spanning tree enabled links, e.g., spanning tree links 48M and 48N, may have the same path cost. However, one node of the node protection pair 42M, 42N needs to be designated as the primary node. As such, one of the spanning tree links 48M, 48N needs to be biased so that one spanning tree link, e.g., 48N, is blocked. When the spanning tree link, e.g., 48M, associated with the primary node fails, the path cost of the failed link is higher than the biased path cost associated with the spanning tree link, e.g., 48N, associated with the secondary node, e.g., node 42N. Thus, STP unblocks the spanning tree link associated with the secondary node.

For example, referring again to FIG. 2, assume that spanning tree link 48M, between node 42M and spanning tree capable node 45A, is a fiber optic link, and that spanning tree link 48N, between node 42N and spanning tree capable node 45A, is a copper link. In general, fiber optic material can handle more traffic and transmit the traffic faster than copper. As such, a network operator may prefer using the high speed fiber optic spanning tree link 48M over copper spanning tree link 48N. Using the techniques of this disclosure, a network operator may apply a biasing factor to the STP cost associated with spanning tree link 48M. For example, the biasing factor may be an integer value that is assigned to the path and stored in memory such that when spanning tree computations are made by the node protection pair, and in particular by a processor of each node 42M, 42N of the pair, the actual spanning tree path cost may be multiplied by the biasing factor to produce a biased spanning tree path cost that may be used in selecting one of the nodes of the node protection pair as always having the unblocked link to the STCN 45A. In this manner, copper link 48N may be weighted more heavily than fiber optic spanning tree link 48M when determining which spanning tree link, 48M or 48N, shall be blocked, such that copper spanning tree link 48N will be disfavored. It should be noted that the path costs associated with the spanning tree links associated with a node protection pair may be the same, but application of a bias allows the network operator to select one of the nodes of the node protection pair as the primary node.

Figure 3:
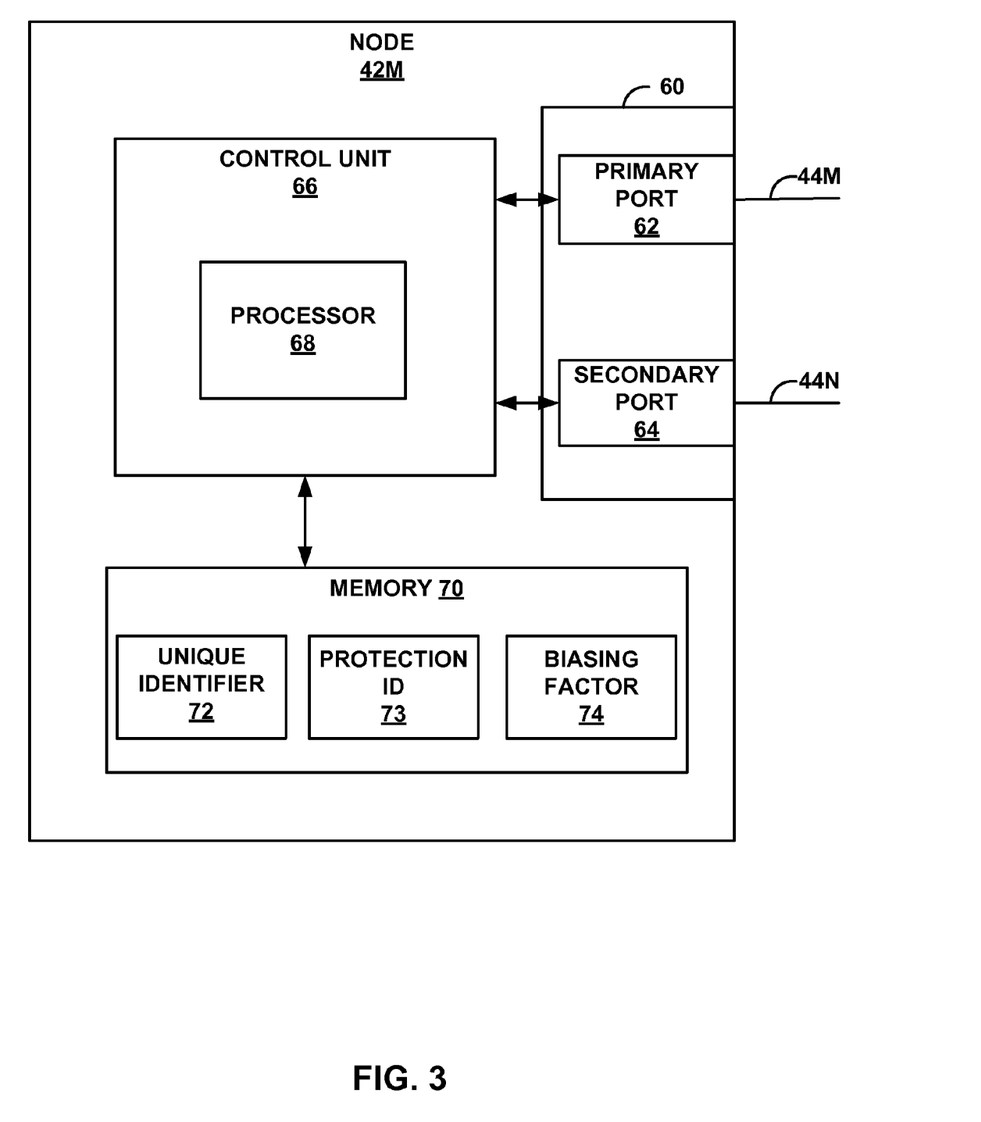
FIG. 3 is a block diagram illustrating an example of a node on the ring network of FIG. 2 that may implement the techniques described in this disclosure.

FIG. 3 is a block diagram illustrating, in more detail, an example of one of the ring nodes of a node protection pair, e.g., node 42M in ring network 40 shown in FIG. 2, that may implement the techniques described in this disclosure. Although FIG. 3 illustrates ring node 42M, each ring node in a node protection pair, e.g., nodes 42C, 42D, and 42N, may be similarly configured. As shown in FIG. 3, node 42M includes interface module 60. Interface module 60 represents a module for interfacing with each of ring links 44M, 44N. Interface module 60 includes primary port 62 and secondary port 64, where primary port 62 interfaces with ring link 44M and secondary port 64 interfaces with ring link 44N. Primary port 62 and secondary port 64 are illustrated in this manner merely for exemplary purposes and represent logical designations. That is, currently designated secondary port 64 may be re-designated as a primary port and primary port 62 may also be re-designated as a secondary port. Interface module 60 may represent hardware, software, or a combination of both to implement the techniques described in this disclosure.

Although not shown for ease of illustration purposes, interface module 60 may comprise additional ports for receiving additional links. For example, interface module comprises an additional port for interfacing with spanning tree link 48M to couple node 42M to spanning tree capable node 45A.

Node 42M also includes a control unit 66 that couples to interface module 60 and, in particular, primary port 62 and secondary port 64. Control unit 66 may comprise one or more processors 68 that execute software instructions, such as those used to define a software or computer program, stored in a computer-readable storage medium such as memory 70 (e.g., a Flash memory, random access memory (RAM), or any other type of volatile or non-volatile memory that stores instructions), or a storage device (e.g., a disk drive, or an optical drive). Alternatively, control unit 66 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

In accordance with the techniques of this disclosure, node 42M may further store in memory 70 the unique identifier that identifies node protection pair 42M, 42N within ring network 40. The unique identifier may be stored as unique identifier 72 within memory 70, and may be stored at the direction of a network operator or administrator upon configuration of the node protection pair. The unique identifier is an identifier for the node pair that is at least unique with respect to the identifiers of the other node pairs within the ring network. A network operator may program each node pair with the unique identifier. Examples of unique identifiers include, but are not limited to, a character string or a numerical value. In some examples, a character string or numerical value may be assigned to node 42M by an administrator. In other examples, the character string or numerical value may be programmed at the time of manufacture.

In addition, node 42M may also store in memory 70 a protection identifier as protection ID 73 in memory 70. In one example, protection ID 73 is a fixed identifier that is common to all nodes that have been configured to act as a node in any node protection pair. Protection ID 73 may be, for example, a media access control (MAC) address reserved for identification purposes. For example, a network operator may have set a control bit on the node in order to enable node protection on the node. Protection ID 73 allows nodes that have node protection enabled, e.g., nodes 42M and 42N, to capture encapsulated BPDUs for further inspection. The processor of a node with node protection enabled may receive the encapsulated BPDU, compare the protection ID in the data unit, e.g., in the header of the data unit, against the programmed protection ID 73. This step allows nodes that are acting as part of a node protection pair to easily identify data units comprising encapsulated BPDUs. If the programmed protection ID matches the received protection ID, the processor may then de-encapsulate the encapsulated BPDU in order to determine whether the BPDU was actually destined for that particular node. Processor 68 then compares the received unique identifier against unique identifier 72 programmed in, for example, node 42M, in order to determine if the BPDU was sent from the other node of the node protection pair, e.g., node 42N. Nodes 42 in ring network 40 that do not have node protection enabled simply forward the encapsulated BPDU to the next node in the ring without taking any action.

As mentioned above, a spanning tree network, e.g., spanning tree network 46A, transmits via a spanning tree capable node, e.g., STCN 45A, spanning tree bridge protocol data units (BPDU) comprising spanning tree information to each of the nodes forming the node pair, e.g., nodes 42M and 42N, connected to the spanning tree capable node. Control unit 66 and, in particular processor 68 is configured to execute spanning tree protocol instructions or algorithms that perform spanning tree computations. As such, node 42M is configured to connect to spanning tree network 46A. Similarly, the control units of nodes 42N, 42C, and 42D, for example, are also configured to execute spanning tree protocol instructions or algorithms that perform spanning tree computations and, as such, nodes 42N, 42C, and 42D are configured to connect to spanning tree networks 46A and 46B.

Upon receiving the BPDU from a spanning tree capable node, e.g., STCN 45A, control unit 66 and, in particular processor 68 of node 42M performs spanning tree computations via spanning tree algorithms based on information in the received BPDU. As mentioned above, processor 68 executes spanning tree algorithms that perform computations in order to generate a new BPDU, based on the received BPDU from the spanning tree capable node, and transmit the new BPDU to the STP-enabled virtual link, e.g., virtual link 44N', that connects the two nodes of the node pair, e.g., nodes 42M and 42N. Node 42M, for example, constructs a data unit that includes the new BPDU as well as the unique identifier stored as unique identifier 72 within memory 70. In other words, for the ring ports on the primary node 42M and the secondary node 42N, the normal BPDU that would have been transmitted out that port is replaced by an encapsulated BPDU. This new BPDU contains the normal BPDU plus the unique identifier, or STP domain name, assigned to the node 42M. By including the STP domain name in the BPDU, it allows the other node in the STP domain pair to know that the BPDU is intended for it. Including the STP domain name in the BPDU is necessary to support multiple STP domains on a single ring. The encapsulated BPDU transmitted out a given STP domain's primary node and secondary node Ring ports are to be received only by the node's partner in the STP domain. Other nodes on the ring will simply forward the BPDU packet. The ring's control node will forward these BPDUs through the port that it has currently blocked.

Node 42M of ring network 40 is executing a ring topology protocol, e.g., IEEE 802.17 Resilient Packet Ring Protocol, Rapid Ring Protection Protocol, Resilient Ethernet Protocol, and RFC-3619. Upon receiving the BPDU from the spanning tree network, e.g., spanning tree network 46A, processor 68 executes instructions that encapsulate the BPDU as header information or trailer information in a ring topology protocol control data unit. Again, because STP does not run on ring network 40, spanning tree information, in the form of a BPDU, must be encapsulated and transported over the ring network via a data unit used by a ring topology protocol, e.g., a ring topology protocol control data unit.

In some examples, processor 68 of node 42M, for example, encapsulates the new BPDU as header information or trailer information in a ring topology protocol control data unit, and forwards the ring topology protocol control data unit comprising the new BPDU around network 40.

In some examples, processor 68 provides, in a field in the ring topology protocol control data unit, an identifier that identifies the node protection pair that includes node 42M within ring network 40. For example, processor 68 may read the unique identifier from unique identifier 72 stored in memory 70 and include the identifier in another field of the header.

In another example, processor 68 provides, in a second and a third field in the ring topology protocol control data unit, a root bridge identifier for the first spanning tree network and path cost information, respectively. For example, if node 42M is the root bridge, processor 68 may read the root bridge identifier, e.g., its MAC address (not shown), stored in memory 70 and include it in a field in the header of the data unit during the encapsulation process. In addition, spanning tree costs computed by processor 68 using the spanning tree algorithms may be included in another field in the header of the data unit during the encapsulation process. Processor 68 may then execute instructions that result in the data unit being transmitted from one of its ports, e.g., primary port 62, onto ring network 40. The data unit traverses ring network 40 and is forwarded by other nodes 42, including the control node. As noted above, the control node on ring network 40 will forward the data unit comprising the BPDU through the port that it blocked in order to prevent looping.

Again, the data unit comprising the spanning tree protocol information is being sent by one node of a node protection via ring network 40 in order to reach the second node of the node protection pair. The two nodes of a node protection pair are exchanging information that contains spanning tree information so that they may coordinate activity with respect to the links that connect each node to the spanning tree capable node. Each node protection pair on ring network 40 has no interest in the information being sent by other node protection pairs and their related spanning tree networks. For example, the node protection pair comprising nodes 42C and 42D has no interest in the spanning tree information being transmitted between node protection pair 42M and 42N. However, because nodes 42C and 42D, in particular their respective processors 68, recognize the protection ID of the data unit, upon receiving a data unit comprising the BPDU, each node will de-encapsulate the received data unit, and compare the unique identifier, e.g., in the header of the data unit, against the unique identifier 72 stored in their respective memories 70. If the comparison reveals that the data unit was not meant for them, nodes 42C and 42D will reencapsulate the data unit and place it back on ring network 40.

Eventually, the data unit will reach the second node of the node protection pair, e.g., node 42N, i.e., the originally intended node. Node 42N is programmed with the same unique identifier as node 42M. Processor 68 will de-encapsulate the data unit and compare it to the unique identifier 72 stored in memory 70. Because the unique identifier 72 will match the unique identifier in the header, node 42N will store the spanning tree information of the BPDU. In this manner, spanning tree networks and Ethernet ring networks may interoperate without adversely affecting the ability of the ring topology and the ring control protocol to correctly route traffic because nodes 42 on ring network 40 that are not node protection pairs ignore the spanning tree information being transmitted around the ring.

Figure 4:
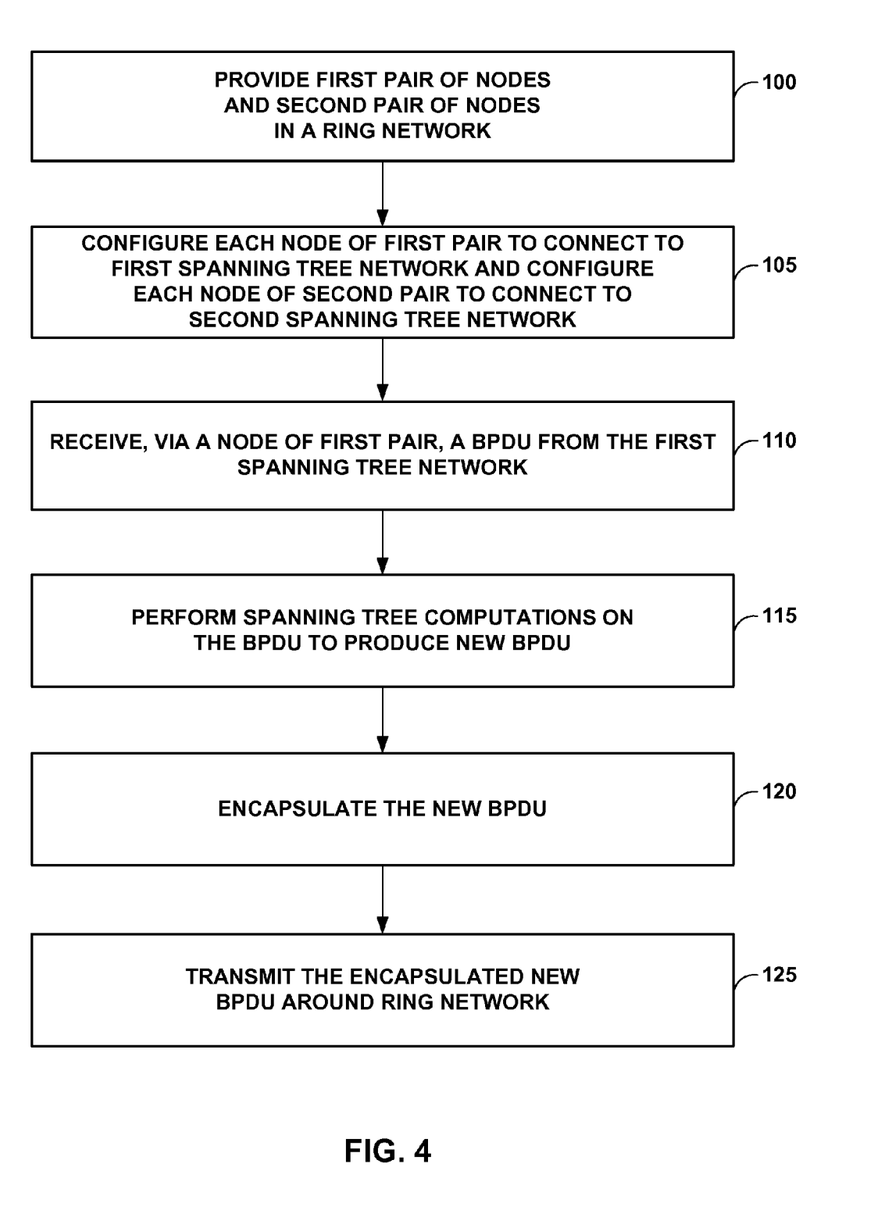
FIG. 4 is a flow diagram illustrating an example method of joining multiple spanning tree networks to a ring network using the techniques described in this disclosure.

FIG. 4 is a flow diagram illustrating an example method of joining multiple spanning tree networks to a ring network using the techniques described in this disclosure. In the example method depicted in FIG. 4, a first pair of nodes, e.g., nodes 42M and 42N, and a second pair of nodes, e.g., nodes 42C and 42D, are provided in a ring network, e.g., ring network 40 (100). Each node of the first and second pair of nodes may be, for example, layer 2 network devices. Each node, in particular processor 68 of each node, of the first pair of nodes of the ring network is configured to connect to a first spanning tree network, e.g., spanning tree network 46A, and each node of the second pair of nodes of the ring network is configured to connect to a second spanning tree network, e.g., spanning tree network 46B (105). Each node is configured to connect to a spanning tree network due to the fact that processor 68 is executing spanning tree protocol instructions.

The method shown in FIG. 4 depicts optional steps 110-125. In FIG. 4, the method may further include one or both nodes of the first pair of nodes receiving a spanning tree bridge protocol data unit from the first spanning tree network (110). For example, processor 68 of node 42M may receive via interface 60 a BPDU that was generated by a spanning tree capable device on first spanning tree network 46A. Then, processor 68 may execute instructions that perform spanning tree computations via spanning tree algorithms based on the received BPDU in order to create a new spanning tree BPDU (115). Processor 68 may encapsulate the new BPDU (120), e.g., encapsulating the new BPDU as header information or trailer information in a ring topology protocol control data unit. Then, processor 68 may transmit the encapsulated new BPDU around the ring network (125).

In some examples, the method includes processor 68 providing, in a field in the ring topology protocol control data unit, a unique identifier that identifies the first pair of nodes. In other examples, the method may include programming, e.g., during manufacture or by a network administrator, each node of the first pair of nodes to recognize the identifier that identifies the first pair of nodes.

In another example, the method shown in FIG. 4 may also include providing, e.g., via processor 68 of node 42M, in a second field and a third field in the ring topology protocol control data unit, a root bridge identifier for the first spanning tree network and path cost information, respectively. The root bridge identifier may be, for example, a character string or a numerical value. The path cost information may be numerical values.

In another example, the method may also include processor 68, e.g., of node 42M, applying a biasing factor to a spanning tree path cost, wherein the biasing factor weights one of a first link and a second link more heavily in the determining of which link shall be unblocked and which link shall be blocked. For example, if spanning tree link 48M, between node 42M and spanning tree capable node 45A, is a fiber optic link, and spanning tree link 48N, between node 42N and spanning tree capable node 45A, is a copper link, a network operator may apply a biasing factor, e.g., a numerical value such as an integer, to the STP cost associated with spanning tree link 48M. In this manner, copper link 48N may be weighted more heavily than fiber optic link 48M during the determination of which link shall be unblocked and which link shall be blocked such that copper link 48N will be disfavored.

Figure 5:
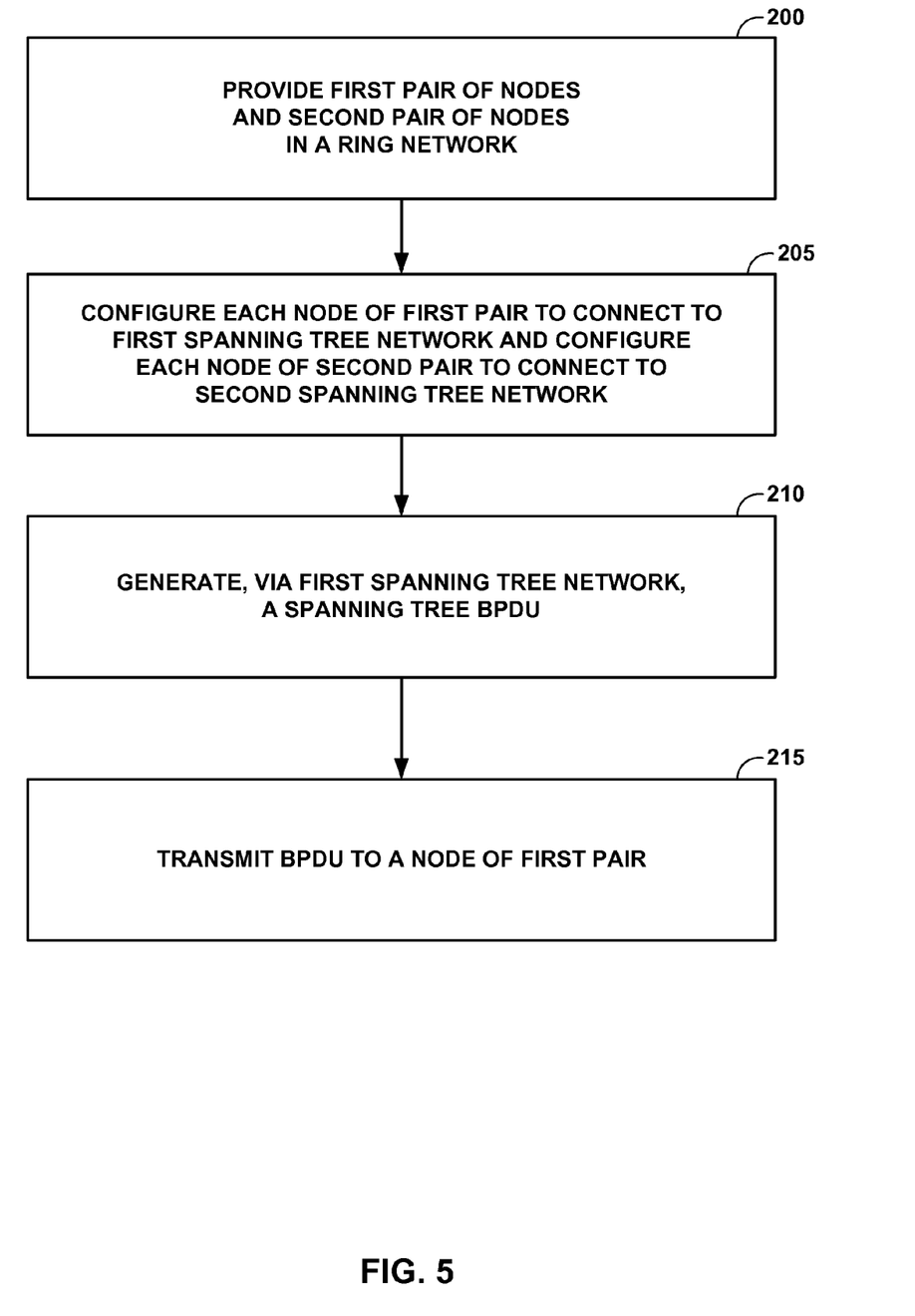
FIG. 5 is a flow diagram illustrating another example method of joining multiple spanning tree networks to a ring network using the techniques described in this disclosure.

FIG. 5 is a flow diagram illustrating another example method of joining multiple spanning tree networks to a ring network using the techniques described in this disclosure. Steps 200 and 205 of FIG. 5 are similar to steps 100 and 105 shown in FIG. 4 and will not be described again. The method of FIG. 5 further includes generating, via the first spanning tree network, e.g., spanning tree capable node 45A on first spanning tree network 46A, a spanning tree BPDU. As mentioned above, neither of the nodes of the node protection pair needs to be the root bridge for the spanning tree network in order for the techniques of this disclosure to be implemented. Rather, spanning tree capable node 45A, for example, may be the root bridge for the spanning tree network. Or, another node executing spanning tree protocol in the first spanning tree network may be the root bridge. Regardless, a network device in a spanning tree network may execute spanning tree protocol instructions to generate a spanning tree BPDU (210). Processor 68 may then execute instructions that cause the BPDU to be transmitted via interface 80 to one of the nodes, e.g., node 42M, of the node protection pair. Upon receiving the BPDU, processor 68 of node 42M may execute instructions that perform spanning tree computations via spanning tree algorithms based on the received BPDU in order to create a new spanning tree BPDU. Processor 68 may encapsulate the new BPDU, e.g., as header or trailer information, as part of the ring topology protocol control data unit and transmits it around network 40, as described above.

Figure 6:
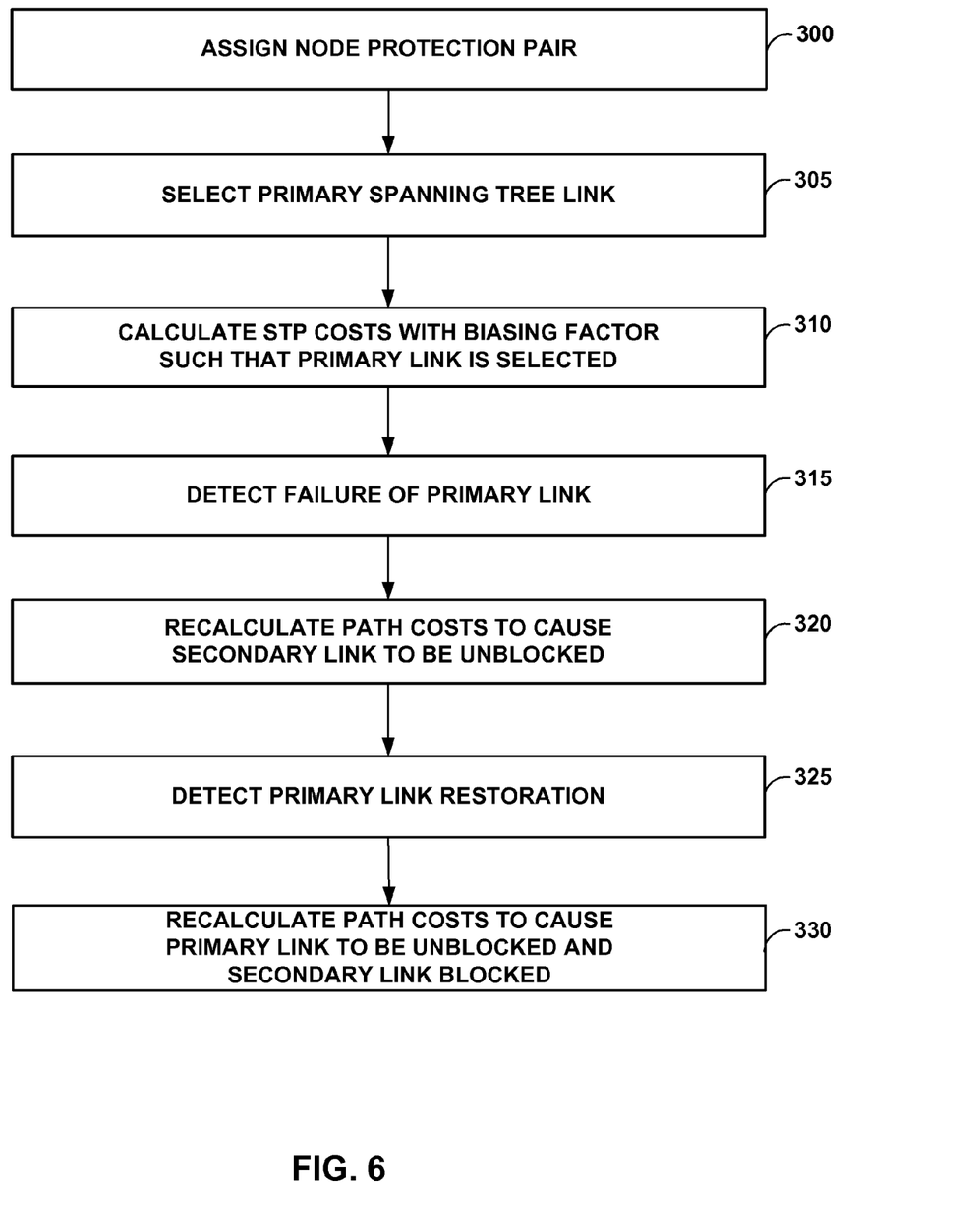
FIG. 6 is a flow diagram illustrating an example protection operation when a primary link failure occurs using the techniques described in this disclosure.

FIG. 6 is a flow diagram illustrating an example protection operation when a primary link failure occurs using the techniques described in this disclosure. On a ring network, two nodes are assigned to be a node protection pair, e.g., nodes 42M, 42N (300). A network operator, for example, selects one spanning tree enabled link, e.g., spanning tree link 48M, as the primary link between a spanning tree capable node, e.g., STCN 45A, and the node protection pair (305). Spanning tree protocol calculates path costs, optionally applying a biasing factor to the path costs, such that the primary spanning tree link is selected by blocking appropriate ports associated with the hardware devices comprising the spanning tree capable node, e.g., STCN 45A, and the nodes forming the node protection pair, e.g., node 42M and 42N (310). A failure in the primary spanning tree link, e.g., spanning tree link 48M, is detected and the primary node, e.g., node 42M, generates a BPDU that indicates a very high cost associated with primary spanning tree link 48M (315), encapsulates the new BPDU, and transmits the encapsulated BPDU around the ring network in a ring control data unit. Spanning tree protocol recalculates the path costs associated with the spanning tree network and based on the new path costs, unblocks appropriate ports associated with the hardware devices comprising the spanning tree capable node, e.g., STCN 45A, and the nodes forming the node protection pair, e.g., node 42M and 42N, such that the secondary spanning tree link, e.g., spanning tree link 48N, is unblocked (320). That is, despite the high path cost associated with the secondary spanning tree link, that high path cost is less than the path cost of the failed primary spanning tree link. Restoration of the primary spanning tree link is detected (325). Node 42M generates a BPDU indicating a low path cost associated with primary spanning tree link 48M, encapsulates the BPDU, and transmits the encapsulated BPDU around the ring in a ring control data unit. Path costs are recalculated by spanning tree computations (330) causing appropriate ports associated with the hardware devices comprising the spanning tree capable node, e.g., STCN 45A, and the nodes forming the node protection pair, e.g., node 42M and 42N, to be blocked and unblocked to restore use of the primary spanning tree link, e.g., 48M, over the secondary spanning tree link, e.g., 48N.

It should be noted that a single spanning tree network may be joined across a ring network using the techniques of this disclosure. In addition, each spanning tree network may have many more nodes than shown in FIG. 2, including additional ring nodes in other ring networks and additional spanning tree capable nodes.

The techniques described in this disclosure may be implemented, at least in part, in hardware, software, firmware or any combination thereof. For example, various aspects of the described techniques may be implemented within one or more processors, including one or more microprocessors, digital signal processors (DSPs), network processors (NPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate computing hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples of the disclosure have been described. These and other examples are within the scope of the following claims.

The invention claimed is:

1. A method comprising:
providing, in a ring network, a first pair of nodes and a second pair of nodes;
configuring each node of the first pair of nodes of the ring network to connect to a first spanning tree network and configuring each node of the second pair of nodes of the ring network to connect to a second spanning tree network;
receiving, via at least one node of the first pair of nodes of the ring network, a spanning tree bridge protocol data unit (BPDU) from the first spanning tree network;
performing spanning tree computations on the BPDU to produce a new BPDU based on the received BPDU;
encapsulating the new BPDU as header information or trailer information in a ring topology protocol control data unit; and
transmitting the new BPDU around the ring network.

2. The method of claim 1, further comprising:
providing, in a field in the ring topology protocol control data unit, an identifier that identifies the first pair of nodes.

3. The method of claim 2, further comprising:
programming each node of the first pair of nodes to recognize the identifier that identifies the first pair of nodes.

4. The method of claim 2, wherein the field is a first field, the method further comprising:
providing, in a second field and a third field in the ring topology protocol control data unit, a root bridge identifier for the first spanning tree network and path cost information, respectively.

5. The method of claim 1, further comprising:
generating, via the first spanning tree network, the spanning tree bridge protocol data unit (BPDU); and
transmitting, via a first spanning tree capable node, the BPDU to at least one node of the first pair of nodes of the ring network.

6. The method of claim 5, wherein the first spanning tree capable node generates the BPDU.

7. The method of claim 1, wherein each node of the first and second pair of nodes are layer two network devices.

8. The method of claim 1, further comprising:
applying a biasing factor to a spanning tree path cost, wherein the biasing factor weights one of a first link and a second link more heavily in the determination of blocked and unblocked links.

9. A network comprising:
a first pair of nodes and a second pair of nodes configured in a ring network; and
a first spanning tree network and a second spanning tree network,
wherein each node of the first pair of nodes of the ring network is configured to connect to the first spanning tree network,
wherein each node of the second pair of nodes of the ring network is configured to connect to the second spanning tree network, and
wherein at least one node of the first pair of nodes of the ring network comprises a processor configured to:
receive a spanning tree bridge protocol data unit (BPDU) from the first spanning tree network;

perform spanning tree computations on the BPDU to produce a new BPDU based on the received BPDU;

encapsulate the new BPDU as header information or trailer information in a ring topology protocol control data unit; and transmit the new BPDU around the ring network.

10. The network of claim 9, wherein the processor is further configured to:

provide, in a field in the ring topology protocol control data unit, an identifier that identifies the first pair of nodes.

11. The network of claim 10, wherein each node of the first pair of nodes is programmed to recognize the identifier that identifies the first pair of nodes.

12. The network of claim 10, wherein the field is a first field, the processor further configured to:

provide, in a second field and a third field in the ring topology protocol control data unit, a root bridge identifier for the first spanning tree network and path cost information, respectively.

13. The network of claim 9, wherein the first spanning tree network is configured to:

generate the spanning tree bridge protocol data unit (BPDU); and transmit, via a first spanning tree capable node, the BPDU to at least one node of the first pair of nodes of the ring network.

14. The network of claim 13, wherein the first spanning tree capable node generates the BPDU.

15. The network of claim 9, wherein each node of the first and second pair of nodes are layer two network devices.

16. The network of claim 9, wherein at least one node of the first pair of nodes of the ring network comprises a processor configured to:

apply a biasing factor to a spanning tree path cost, wherein the biasing factor weights one of a first link and a second link more heavily in the determination of blocked and unblocked links.

17. A network device comprising a processor configured to:

receive a spanning tree bridge protocol data unit (BPDU) from a first spanning tree network;

perform spanning tree computations on the BPDU to produce a new BPDU based on the received BPDU;

encapsulate the new BPDU as header information or trailer information in a ring topology protocol control data unit; and transmit the new BPDU around the ring network.

18. The network device of claim 17, wherein the processor is further configured to:

provide, in a field in the ring topology protocol control data unit, an identifier that identifies a first pair of nodes in a ring network.

19. The network device of claim 18, wherein the processor is further configured to:

recognize the identifier that identifies the first pair of nodes.

20. The network device of claim 18, wherein the field is a first field, and wherein the processor is further configured to:

provide, in a second field and a third field in the ring topology protocol control data unit, a root bridge identifier for the first spanning tree network and path cost information, respectively.

21. The network device of claim 17, wherein the processor is further configured to:

apply a biasing factor to a spanning tree path cost, wherein the biasing factor weights one of a first link and a second link more heavily in the determination of blocked and unblocked links.

22. A network device comprising:

means for receiving a spanning tree bridge protocol data unit (BPDU) from a first spanning tree network;

means for performing spanning tree computations on the BPDU to produce a new BPDU based on the received BPDU;

means for encapsulating the new BPDU as header information or trailer information in a ring topology protocol control data unit; and means for transmitting the new BPDU around the ring network.

23. The network device of claim 22, further comprising:

means for providing, in a field in the ring topology protocol control data unit, an identifier that identifies a first pair of nodes in a ring network.

24. The network device of claim 23, further comprising:

means for recognizing the identifier that identifies the first pair of nodes.

25. The network device of claim 23, further comprising:

means for providing, in a second field and a third field in the ring topology protocol control data unit, a root bridge identifier for the first spanning tree network and path cost information, respectively.

26. The network device of claim 22, further comprising:

means for applying a biasing factor to a spanning tree path cost, wherein the biasing factor weights one of a first link and a second link more heavily in the determination of blocked and unblocked links.

27. A non-transitory computer-readable medium comprising instructions encoded on the computer-readable medium that, upon execution, cause a processor within a network device to:

receive a spanning tree bridge protocol data unit (BPDU) from a first spanning tree network;

perform spanning tree computations on the BPDU to produce a new BPDU, based on the received BPDU;

encapsulate the new BPDU as header information or trailer information in a ring topology protocol control data unit; and transmit the new BPDU around the ring network.

28. The non-transitory computer-readable medium of claim 27, further comprising instructions to cause the processor to:

provide, in a field in the ring topology protocol control data unit, an identifier that identifies a first pair of nodes in a ring network.

29. The non-transitory computer-readable medium of claim 27, further comprising instructions to cause the processor to:

recognize the identifier that identifies the first pair of nodes.

30. The non-transitory computer-readable medium of claim 28, further comprising instructions to cause the processor to:

provide, in a second field and a third field in the ring topology protocol control data unit, a root bridge identifier for the first spanning tree network and path cost information, respectively.

31. The non-transitory computer-readable medium of claim 27, further comprising instructions to cause the processor to:

apply a biasing factor to a spanning tree path cost, wherein the biasing factor weights one of a first link and a second link more heavily in the determination of blocked and unblocked links.

* * * * *